Figure 10:
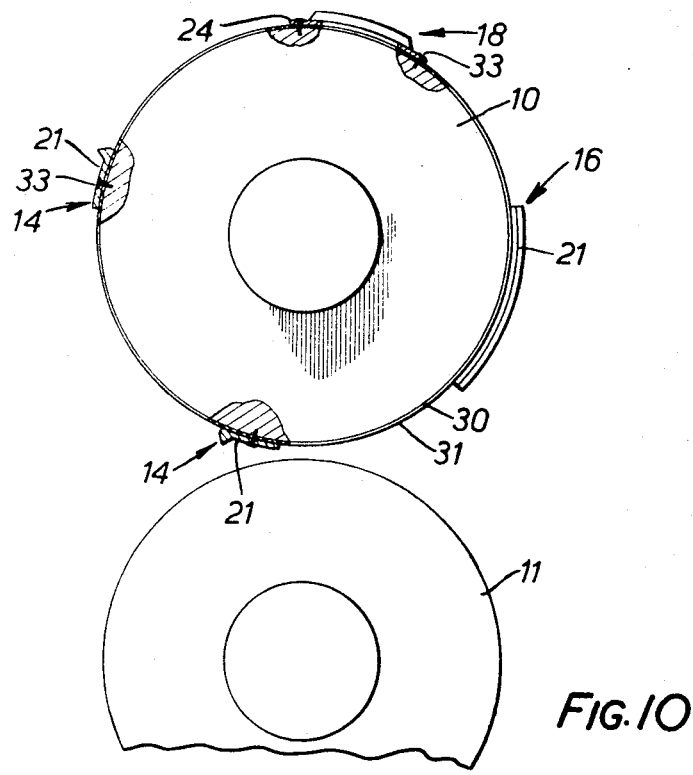

United States Patent [19]
Jarritt et al.

[11] 3,744,384
[45] July 10, 1973

[54] ROLLERS FOR CUTTING, CREASING, PERFORATING OR EMBOSSING SHEET MATERIALS

[75] Inventors: Percival Ward Jarritt; David Michael Jarrett, both of Bristol, England

[73] Assignee: Masson Scott Thrissell Engineering Limited, Bristol, England

[22] Filed: Feb. 11, 1971

[21] Appl. No.: 114,417

[30] Foreign Application Priority Data
Feb. 21, 1970  Great Britain...................... 8,450/70
Mar. 13, 1970  Great Britain................... 12,067/70

[52] U.S. Cl............... 93/58.2 R, 76/107 C, 83/346, 83/673, 93/58.2 F
[51] Int. Cl............................................. B31b 1/14
[58] Field of Search .................. 93/58 R, 58 P, 58.1, 93/58.2 R, 58.2 F, 58.4; 76/107 R, 107 C; 83/343, 347, 348, 674, 678, 673, 675

[56] References Cited
UNITED STATES PATENTS

| | | | |
|---|---|---|---|
| 3,198,093 | 8/1965 | Kirby et al........................ | 93/58.2 F |
| 1,737,553 | 12/1929 | Andrews......................... | 93/58.2 R |
| 3,470,773 | 10/1969 | Mueller............................ | 76/107 R |
| 3,535,955 | 10/1970 | Otto et al.......................... | 76/107 C |
| 3,170,342 | 2/1965 | Downie............................. | 76/107 C |
| 3,190,194 | 6/1965 | Kirby et al........................ | 93/58.2 F |
| 3,496,841 | 2/1970 | Kirby et al........................ | 93/58.2 R |

*Primary Examiner*—Andrew R. Juhasz
*Assistant Examiner*—James F. Coan
*Attorney*—Young & Thompson

[57] ABSTRACT

A roller for cutting, creasing, perforating or embossing sheet materials, such as paper, cardboard or thin plastic, is provided with tools which are secured on the cylindrical roller surface instead of in recesses in the surface. Each tool comprises a thin metal sheet or strip formed to the curvature of the roller surface and having a raised cutting, creasing, perforating or embossing formation. The strip may be formed of a standard rule steel ground to the desired profile, e.g. with an inverted V-section cutting or creasing edge running longitudinally along this strip. A plurality of such strips may be secured around the roller surface at any desired angle to its axis and may be butted against one another at any convenient angle so that the cutting or creasing edges intersect in sharp corners. Complex shapes such as curves may be formed on flat sheets or plates of similar thickness and material to the strips.

3 Claims, 11 Drawing Figures

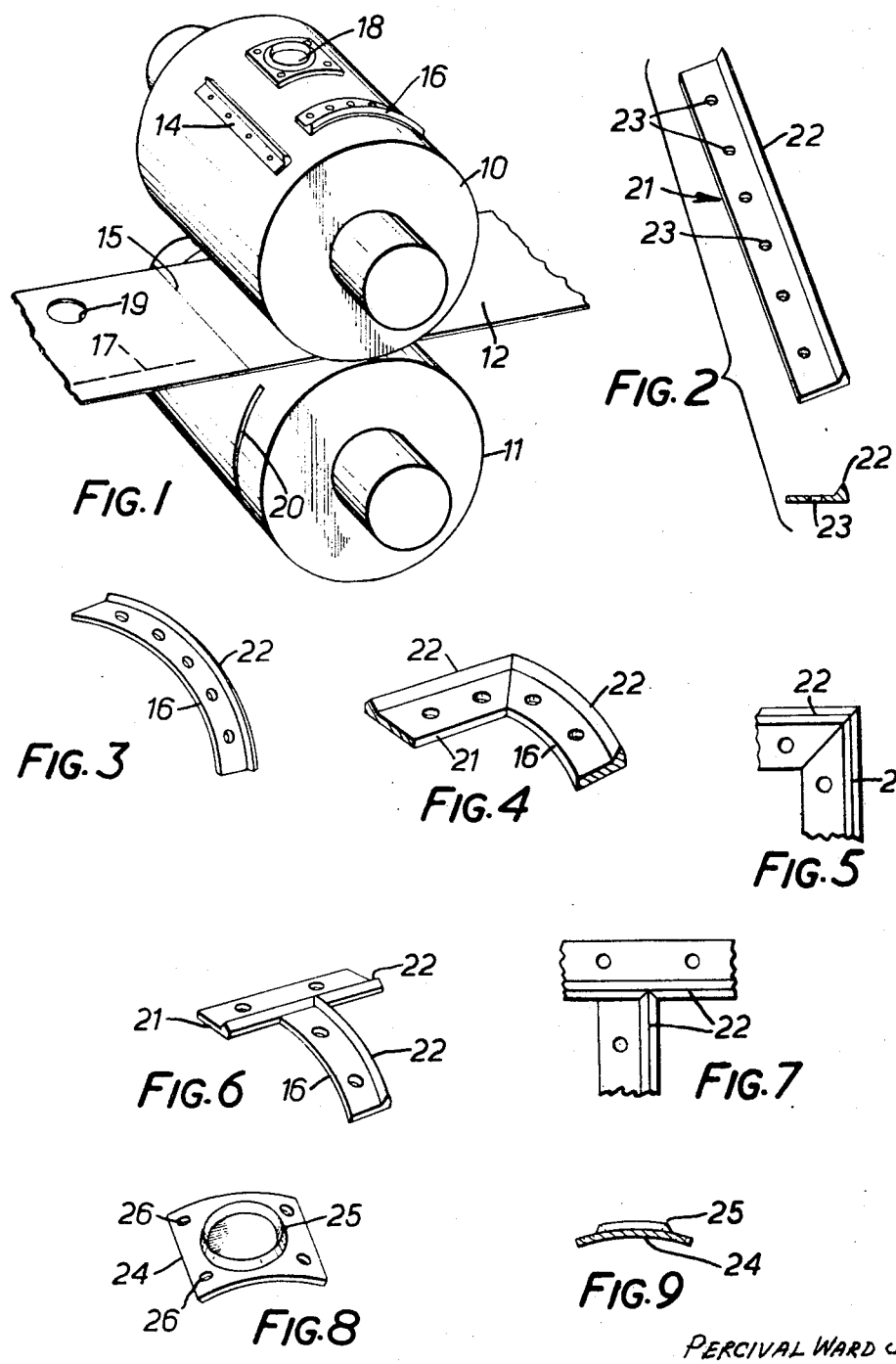

ROLLERS FOR CUTTING, CREASING, PERFORATING OR EMBOSSING SHEET MATERIALS

This invention relates to rollers for cutting, creasing, perforating, or embossing sheet materials, such as paper, cardboard, leather, or synthetic plastics materials, and is particularly though not exclusively applicable to rollers designed for operating on such materials in continuous web form.

Conventional rollers of this type have tools in the form of insert blocks located in slots or grooves in the roller surface, the insert blocks being accurately machined and hand finished to produce the required upstanding cutting, creasing, or embossing formations. The construction and assembly of such a roller is a time-consuming and expensive procedure, and difficulties also arise from small dimensional and positional inaccuracies. Rollers of this type are normally intended to operate in conjunction with a so-called "anvil" roller, which is normally of hard steel, the two rollers being accurately located in bearings. It is therefore important that the tips of the formations on the cutting roller should lie accurately on a cylindrical surface of revolution concentric with the roller axis, and just touching the surface of the anvil roller. To obtain this accuracy it is necessary that the individual insert blocks should be very accurately formed and positioned on the roller, and the locating slots and grooves on the roller should likewise be very accurately formed. In addition the anvil roller should also be truly concentric, and the bearings for the two rollers should have the minimum possible play or concentricity errors. These errors may be cumulative and the problem may be particularly acute if the rollers are used for cutting very thin sheet material such as thin paper.

Accordingly it is an object of the present invention to provide an improved roller construction which will meet some of the above mentioned difficulties.

Broadly the invention consists in a roller for cutting, creasing, perforating or embossing sheet material, having at least one tool which is secured on the cylindrical roller surface and comprises a thin metal sheet or strip formed to the curvature of the roller surface and having a raised cutting, creasing, perforating or embossing formation.

Where the tool comprises a strip, it is preferably formed of a standard rule steel ground to the desired profile, e.g. the profile of a parallel-sided strip with an upstanding inverted V-section cutting or creasing edge running longitudinally along the strip, e.g. along one of its margins or along the middle of the strip.

In general, the roller is provided with a plurality of such strips, which may be secured around the roller surface at any desired angle to its axis and may be butted against one another at any convenient angle, so that the cutting or creasing edges intersect in sharp corners. Complex shapes, such as curves which are impossible to produce on straight strips, may be formed on flat sheets or plates of similar thickness and material to the strips with the required edges profile-machined on them, e.g. by a routing technique, the plates then being formed or bent to conform with the curvature of the roller surface.

The strips may be initially formed in long lengths and drilled at predetermined intervals. For each particular application, the strips can then be cut to length and selected drillings enlarged to serve for receiving locating dowels or countersunk screws. The roller may be drilled and tapped to receive the necessary dowels and screws on a numerical controlled machine tool.

Preferably a thin layer of a relatively resilient material is interposed between the tool and the surface of the roller.

Conveniently the resilient layer is formed at least partly of a synthetic plastics material, such as a vinyl polymer or nylon, and it may have a thickness of between 0.003 inch and 0.010 inch, and preferably approximately 0.005 inch.

It may be preferred to apply the resilient layer over substantially the whole surface of the roller, the tool or tools occupying a limited area thereof, in which case the resilient layer may also constitute a marking or locating chart, to assist in positioning the tool or tools accurately on the roller. Alternatively the resilient layer may be attached to the reverse surface of the individual tool or tools. In any case the resilient layer may be caused to adhere to the roller and/or tool or tools, by means of an adhesive, being for example a self-adhesive sheet.

The use of such a thin resilient backing layer provides for very slight radial movements, or a rocking movement, of each tool relative to the support roller on which it is mounted. It is still important that the tools and both rollers should be accurately formed, but this slight resilient movement, of the order of 0.001 inch, is sufficient to accommodate small dimensional errors in the production of the individual tools, and in forming the locating surfaces on the main roller, and also small clearances in the bearings of the two rollers and dimensional errors in the anvil roller. As a result the cutting, creasing, perforating or embossing roller may be constructed and assembled in a much shorter time than hitherto, and in some cases may be used for cutting very thin sheet material such as thin paper.

Figure 11:
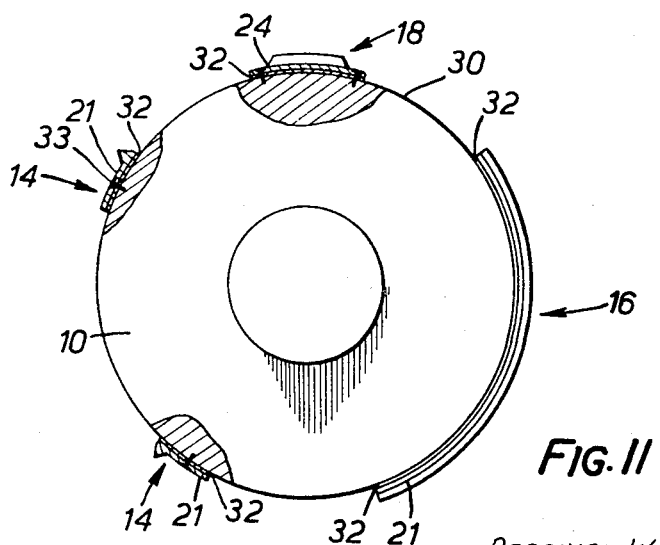

Various embodiments of the invention will now be described in more detail by way of example and with reference to the accompanying drawings, in which:

FIG. 1 is a perspective view of a cutting and creasing roller cooperating with an anvil roller to work on a cardboard web, FIG. 2 is a perspective view of a length of strip material for forming a cutting or creasing tool, FIG. 3 is a similar view of a similar strip bent to conform with the curvature of the roller surface, FIG. 4 shows a perspective view of a mitred 90° intersection of strips as shown in FIGS. 2 and 3, FIG. 5 is a plan view of the intersection as shown in FIG. 4, FIG. 6 is a perspective view of a 90° T-junction of strips as shown in FIGS. 2 and 3, FIG. 7 is a plan view of the junction of FIG. 6, FIG. 8 is a perspective view of a circular cutting tool, FIG. 9 is a section therethrough, FIG. 10 is an end view of the roller showing the mounting of the tools thereon, and FIG. 11 is a view similar to FIG. 10 showing a modified mounting for the tools.

As shown in FIG. 1, the steel cutting roller 10 is of plain cylindrical form and cooperates with an anvil roller 11, which may be steel or "composition," i.e. hard rubber or synthetic plastics or similar material, to work upon a travelling web 12 of cardboard. In the form illustrated, which merely shows examples of the kinds of tools which can be used and is not intended to produce a specific article, the cutting roller 10 has a cutting tool or blade 14 for separating individual blanks from the web 12 as indicated at 15, a creasing tool 16 for inserting a crease as indicated at 17 and a circular cutting tool 18 for cutting out a circular portion from the web as indicated at 19. The cutting tools 14 and 18 cooperate with the plain cylindrical surface of the anvil roller 11 while the creasing tool 16 cooperates with a groove 20 therein, in known manner.

The straight cutting tool 14 and the creasing tool 16 are both formed from straight rule steep strip as shown at 21 in FIG. 2.

The strip 21 is ground to the profile shown in section at the bottom of FIGS. 2 and 3, comprising a parallel sided strip with an upstanding inverted V-section edge 22 along one of its margins. Alternatively, the edge could run along the middle of the strip. For most purposes the edge 22 may be formed with an angle of 55°. The strip is drilled with small holes 23 at specified spacing, e.g. one-sixteenth inch holes on one-fourth inch centres.

To produce a tool such as 14 or 16 from the strip 21, the strip is first cut to the desired length and selected holes 23 are then enlarged to receive locating dowels (not shown) and countersunk screws for locating and securing the strip on the roller 10. The roller 10 is formed with corresponding holes for reception of the dowels and screws on a numerically controlled drilling machine. The programme for the machine can be simply derived from a drawing of a plane development of the roller surface, corresponding to the desired positions of the cuts and creases on the web 12.

Where the strip runs around the circumference of the roller, like the creasing tool 16, it can simply be bent to the required curvature, as seen in FIGS. 1 and 3, and will then be held in the desired shape by the screws. Sharp corners can be formed accurately by making mitred intersections as shown in FIGS. 4 and 5 or T-intersections as shown in FIGS. 6 and 7. The intersections may be made either at included angles of 90°, as shown, or at any other desired angles by cutting off the ends of the strips accordingly. Where the strips are mounted obliquely across the roller surface, they adapt themselves to the helical form required due to the thinness and consequenct flexibility of the strip 21.

Curved cutting tools may be produced as illustrated in FIGS. 8 and 9, the strip 21 being replaced by a plate 24 of similar thickness and flexibility, on which the curved cutting edge 25 is formed by profile machining, for example by a routing technique similar to that used for forming cutting edges on the insert blocks previously used. Holes 26 are provided for reception of countersunk securing screws, as before. The plate 24 is then bent to conform with the curvature of the roller surface.

An embossing tool may be formed similarly to the curved cutting tool of FIG. 8 by forming the plate 24 with a raised embossing formation in place of the curved cutting edge 25.

To provide a small degree of resilience in the mounting of the tools on the roller 10, as explained above, it is preferable to interpose a thin layer of a relatively resilient material between them and cylindrical roller surface. FIGS. 10 and 11 illustrate two examples of this.

In the embodiment of FIG. 10, the roller 10 carries a circular cutting tool 18, a creasing tool 16 and two straight cutting tools 14. Before the individual strips 21 or plates 24 which form the bases of the tools 14,16,18, are attached to the roller 10, the accurately formed cylindrical surface 30 of the roller is coated overall with a thin layer 31 of a synthetic plastics material. For example the roller may be dipped in nylon or spray coated with a vinyl polymer. The plastics layer 31 is then machined to an accurate predetermined thickness of between 0.003 inch, and 0.010 inch, preferably approximately 0.005 inch, producing an accurate external cylindrical surface, and the individual tools are then located on the roller by fixing with small screws 33 as described above.

Alternatively, as shown in FIG. 11, each tool 14,16,18, may have a thin layer 32 of a vinyl plastics material attached to its reverse surface by an adhesive, each tool being then secured to the surface 30 of the roller 10 with the layer 32 of plastics material interposed. The layer 32 may itself be a self-adhesive sheet to assist in holding the tool on the roller surface 30 while the small screws 33 are inserted.

In another method of performing the invention a photographic sheet is prepared from a scribed negative drawn by hand, to indicate the positions of the individual tools on the roller surface. This is then applied to the roller by an adhesive and individual tools are then secured in position over the photographic film by means of screws as in the previous example. The photographic film thus serves the dual purpose of assisting in locating the tools during assembly, and of providing the resilient backing layer mentioned above.

Rollers as described above may be used for cutting, creasing or embossing paper or cardboard sheets, of synthetic plastics material, gasket material or other sheet material. It is possible to provide a roller with strip cutting tools such as 14 and 16 in combination with insert block tools as used heretofore. The rollers described above are very much cheaper to manufacture than those previously employed. In particular the cutting of a multiplicity of grooves in the surface of the roller is rendered unnecessary and sharp corners or intersections between cutting and/or creasing edges can be readily produced without the hand finishing previously required.

We claim:

1. A roller for cutting, creasing, perforating, or embossing sheet material, including in combination a plurality of elongated tool elements each in the form of an elongated strip of rule steel having a relatively wide thin base flange lying parallel with the surface of said roller and an integral relatively low upstanding flange formed with a sharp edge, each of said strips being initially straight and subsequently bent to conform to the surface of said roller, and at least one further tool element in the form of a small steel sheet or plate of substantially smaller area than the surface of said roller, and having a base lying parallel with the surface of said roller and an integral low upstanding flange presenting a nonlinear sharp profiled edge, removable locating elements detachably anchoring said base to said roller, the said base being initially flat and the said profiled edge being initially nonlinear as seen in plan, and the said sheet or plate being subsequently bent to conform to the surface of said roller, and a thin layer of a resilient material interposed directly between each of said tool elements and the surface of said roller, said locating elements extending through said thin layer and into said roller.

2. A roller according to claim 1, wherein the upstanding flanges of both said elongated tool element and said further tool element having machined or ground edges of inverted V-section.

3. A roller according to claim 1 wherein said resilient layer is applied over substantially the whole surface of said roller and carries markings constituting a locating chart for said tool elements, and said tool elements occupy a limited area of said resilient layer.

* * * * *